US010135522B2

(12) United States Patent
Gallagher et al.

(10) Patent No.: US 10,135,522 B2
(45) **Date of Patent: *Nov. 20, 2018**

(54) TRANSCEIVER ARRAY WITH ADJUSTMENT OF LOCAL OSCILLATOR SIGNALS BASED ON PHASE DIFFERENCE

(71) Applicant: Maxlinear, Inc., Carlsbad, CA (US)

(72) Inventors: Timothy Gallagher, Carlsbad, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,238

(22) Filed: Nov. 2, 2017

(65) Prior Publication Data

US 2018/0069620 A1 Mar. 8, 2018

Related U.S. Application Data

(63) Continuation of application No. 15/238,877, filed on Aug. 17, 2016, now Pat. No. 9,825,694.

(60) Provisional application No. 62/206,379, filed on Aug. 18, 2015.

(51) Int. Cl.

| | |
|---|---|
| ***H04B 1/04*** | (2006.01) |
| ***H04B 1/38*** | (2015.01) |
| ***H04B 7/185*** | (2006.01) |
| ***H04B 17/11*** | (2015.01) |
| ***H04B 17/21*** | (2015.01) |
| ***H04B 17/18*** | (2015.01) |

(52) U.S. Cl.

CPC ........... *H04B 7/18513* (2013.01); *H04B 1/04* (2013.01); *H04B 1/38* (2013.01); *H04B 17/11* (2015.01); *H04B 17/18* (2015.01); *H04B 17/21* (2015.01)

(58) Field of Classification Search

CPC ...... H04B 17/14; H04B 17/19; H04B 17/104; H04B 1/40; H04B 17/12; H04B 7/0413; H04B 7/0617; H04B 7/04; H04B 7/18513; H04B 1/0483; H04B 1/403; H04B 17/11; H04B 17/21; H04B 7/18517; H04B 1/38; H04B 7/086; H04B 7/155; H04B 7/1851; H04B 7/18528; H04W 56/0035; H04W 16/28; H04W 24/08

USPC ...... 455/73, 260, 276.1, 259, 318, 103, 141, 455/146, 147, 255

See application file for complete search history.

(56) References Cited

U.S. PATENT DOCUMENTS 9,825,694 B2 11/2017 Gallagher et al.
2011/0279147 A1 11/2011 Montalvo et al.

*Primary Examiner* — Philip Sobutka

(74) *Attorney, Agent, or Firm* — McAndrews, Held & Malloy, Ltd.

(57) ABSTRACT

Aspects of methods and systems for transceiver array synchronization are provided. An array based communications system comprises a plurality of transceiver circuits and an array coordinator. Each transceiver circuit of the plurality of transceiver circuits comprises a plurality of wireless transmitters and a local oscillator generator. Each wireless transmitter of the plurality of wireless transmitters is able to modulate a local oscillator signal from the local oscillator generator based on a weighted sum of a plurality of digital datastreams. The array coordinator is able to adjust a phase of a first local oscillator signal based on a phase difference between the first local oscillator signal and a second local oscillator signal. The first local oscillator signal is generated by a first local oscillator generator of a first transceiver circuit. The second local oscillator signal is generated by a second local oscillator generator of a second transceiver circuit.

44 Claims, 10 Drawing Sheets

TRANSCEIVER ARRAY WITH ADJUSTMENT OF LOCAL OSCILLATOR SIGNALS BASED ON PHASE DIFFERENCE

CROSS-REFERENCE TO RELATED APPLICATIONS/INCORPORATION BY REFERENCE

This application is a continuation of U.S. patent application Ser. No. 15/238,877 filed Aug. 17, 2016, which claims priority to U.S. provisional patent application 62/206,379 titled "Transceiver Array Synchronization" filed on Aug. 18, 2015. Each of the above applications is hereby incorporated herein by reference in its entirety.

BACKGROUND

Limitations and disadvantages of conventional methods and systems for communication systems will become apparent to one of skill in the art, through comparison of such systems with some aspects of the present invention as set forth in the remainder of the present application with reference to the drawings.

BRIEF SUMMARY OF THE INVENTION

Systems and methods are provided for a transceiver array synchronization, substantially as shown in and/or described in connection with at least one of the figures, as set forth more completely in the claims.

Advantages, aspects and novel features of the present disclosure, as well as details of an illustrated embodiment thereof, will be more fully understood from the following description and drawings.

DETAILED DESCRIPTION OF THE INVENTION

Figure 1A:
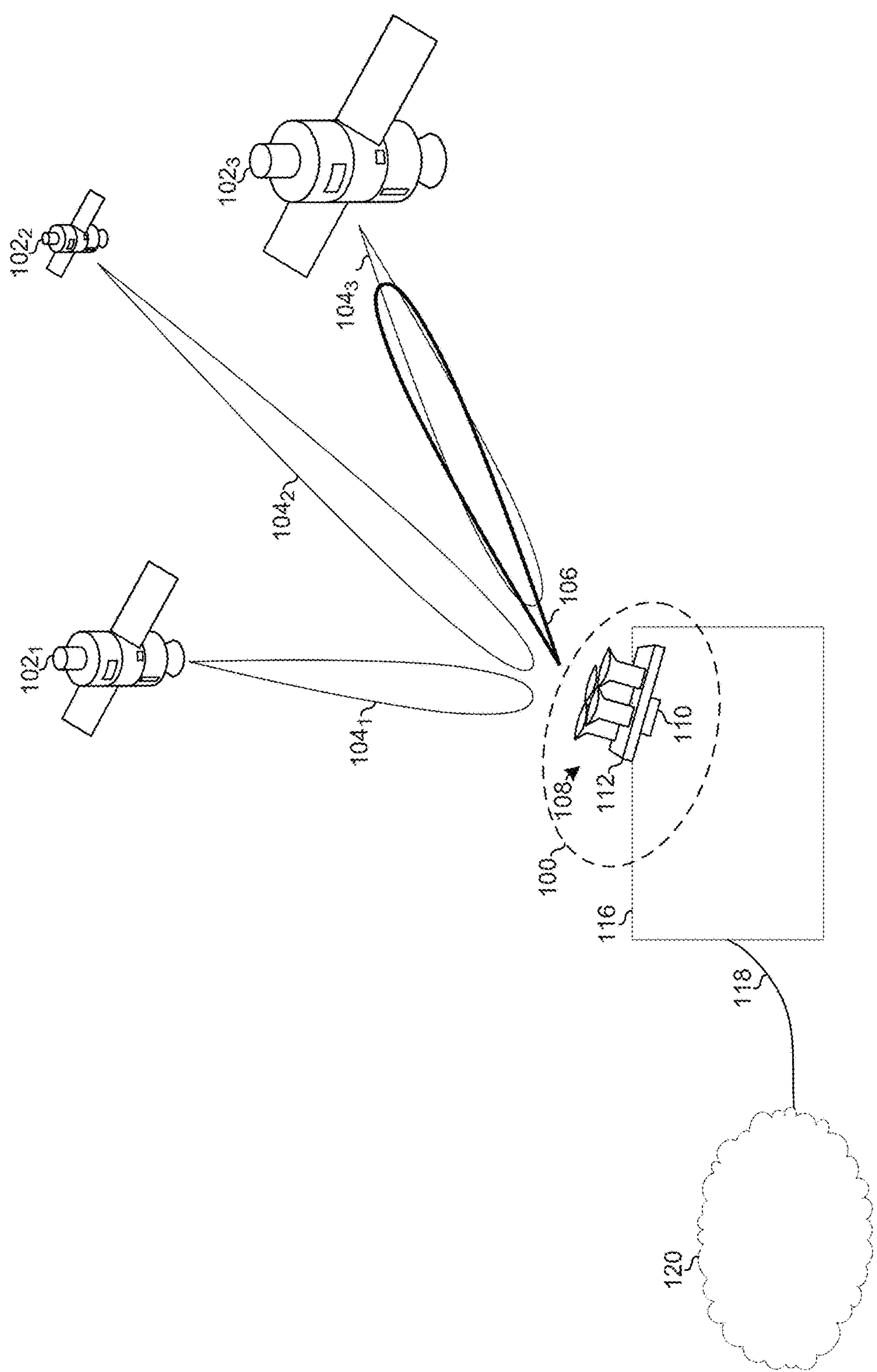
FIG. 1A shows a single-unit-cell transceiver array communicating with a plurality of satellites.

FIG. 1A shows a single-unit-cell transceiver array communicating with a plurality of satellites. Shown in FIG. 1A is a device 116 comprising a transceiver array 100 operable to communicate with a plurality of satellites 102. The device 116 may, for example, be a phone, laptop computer, or other mobile device. The device 116 may, for example, be a desktop computer, server, or other stationary device. In the latter case, the transceiver array 100 may be mounted remotely from the housing of the device 116 (e.g., via fiber optic cables). Device 118 is also connected to a network (e.g., LAN and/or WAN) via a link 118.

Figure 2A:
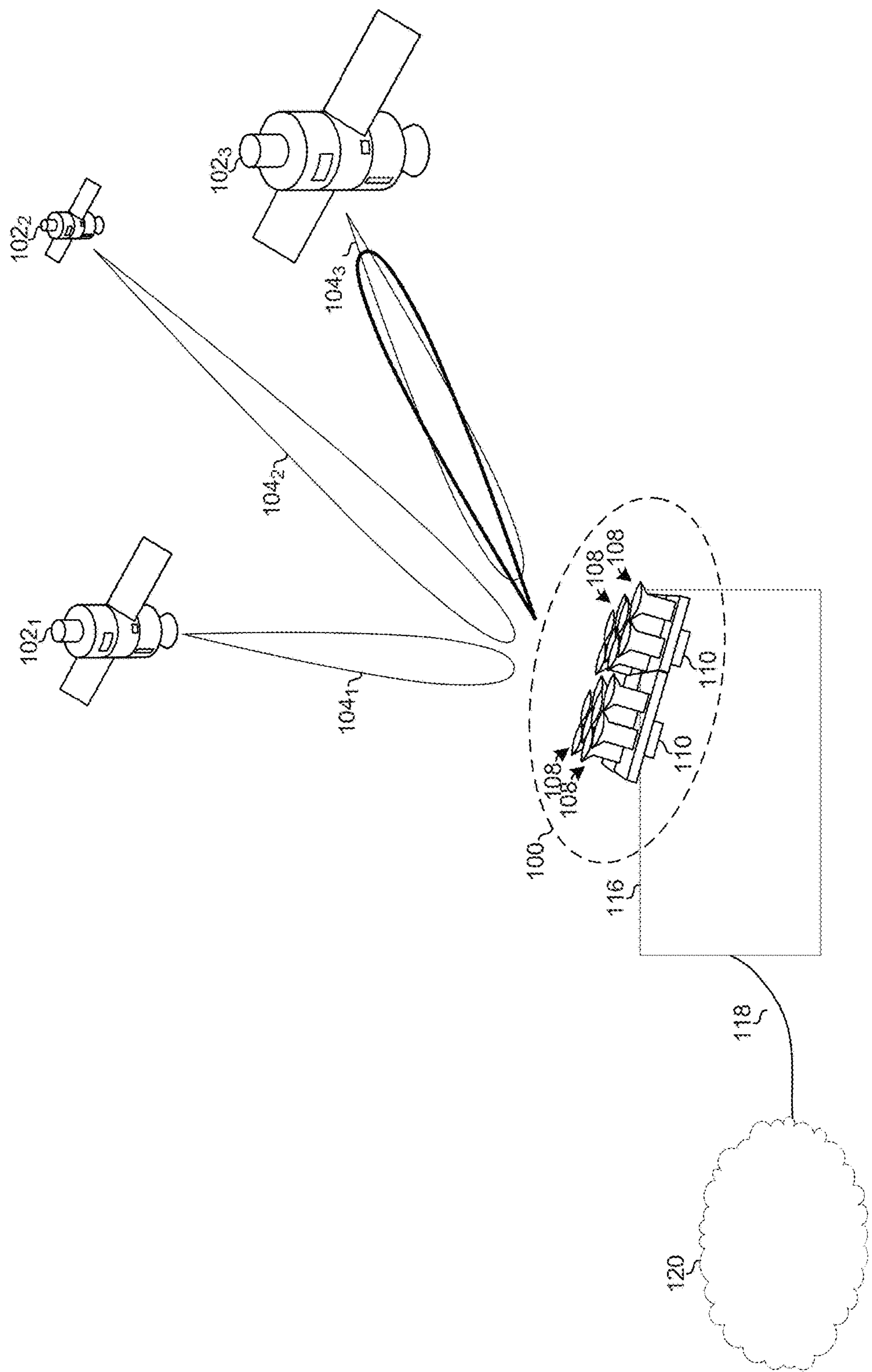
FIG. 2A shows a transceiver which comprises a plurality of the unit cells of FIG. 1B and is communicating with a plurality of satellites.

In an example implementation, the satellites 102 shown in FIGS. 1A and 2A are just a few of hundreds, or even thousands, of satellites having a faster-than-geosynchronous orbit. For example, the satellites may be at an altitude of approximately 1100 km and have an orbit periodicity of around 100 minutes.

Figure 3:
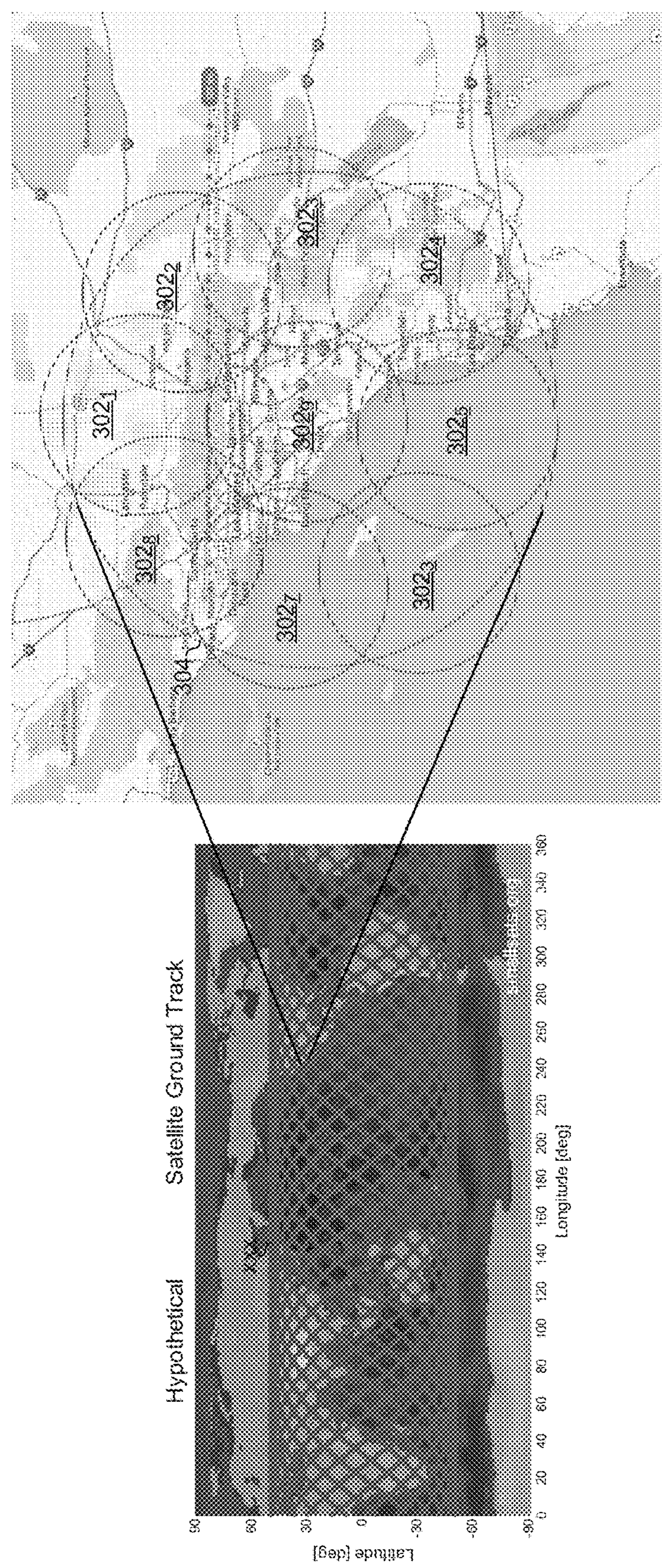
FIG. 3 shows a hypothetical ground track of a satellite system in accordance with aspects of this disclosure.

Each of the satellites 102 may, for example, be required to cover 18 degrees viewed from the Earth's surface, which may correspond to a ground spot size per satellite of ~150 km radius. To cover this area (e.g., area 304 of FIG. 3), each satellite 102 may comprise a plurality of antenna elements generating multiple spot beams (e.g., the nine spot beams 302 of FIG. 3). In an example implementation, each of the satellites 102 may comprise one or more transceiver array, such as the transceiver array 100 described herein, operable to implement aspects of this disclosure. This may enable steering the coverage area of the spot beams without having to mechanically steer anything on the satellite 102. For example, when a satellite 102 is over a sparsely populated area (e.g., the ocean) but approaching a densely populated area (e.g., Los Angeles), the beams of the satellite 102 may be steered ahead such that they linger on the sparsely populated area for less time and on the densely populated area for more time, thus providing more throughput where it is needed.

Figure 1B:
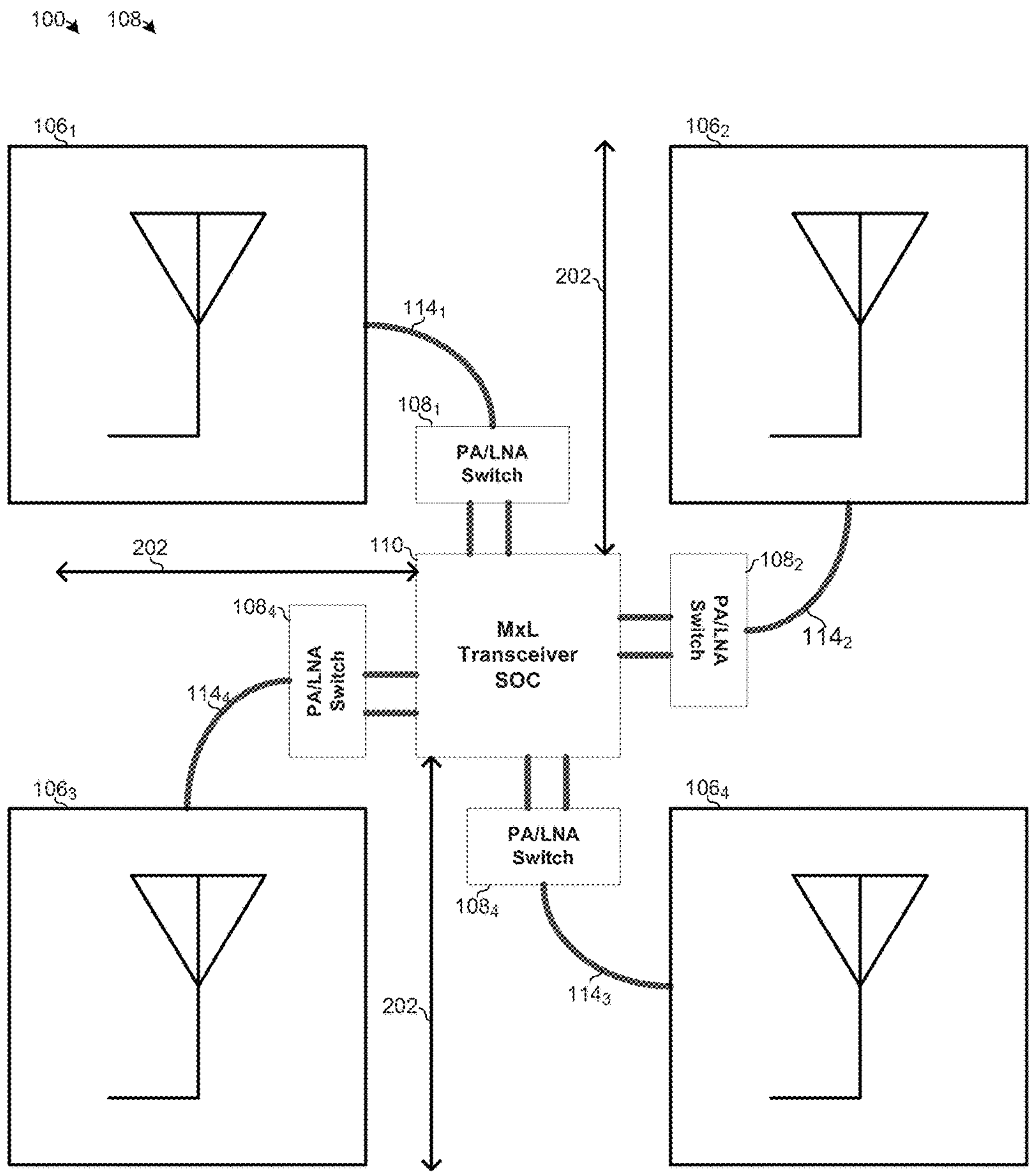
FIG. 1B shows details of an example implementation of the single-unit-cell transceiver array of FIG. 1A.
Figure 2B:
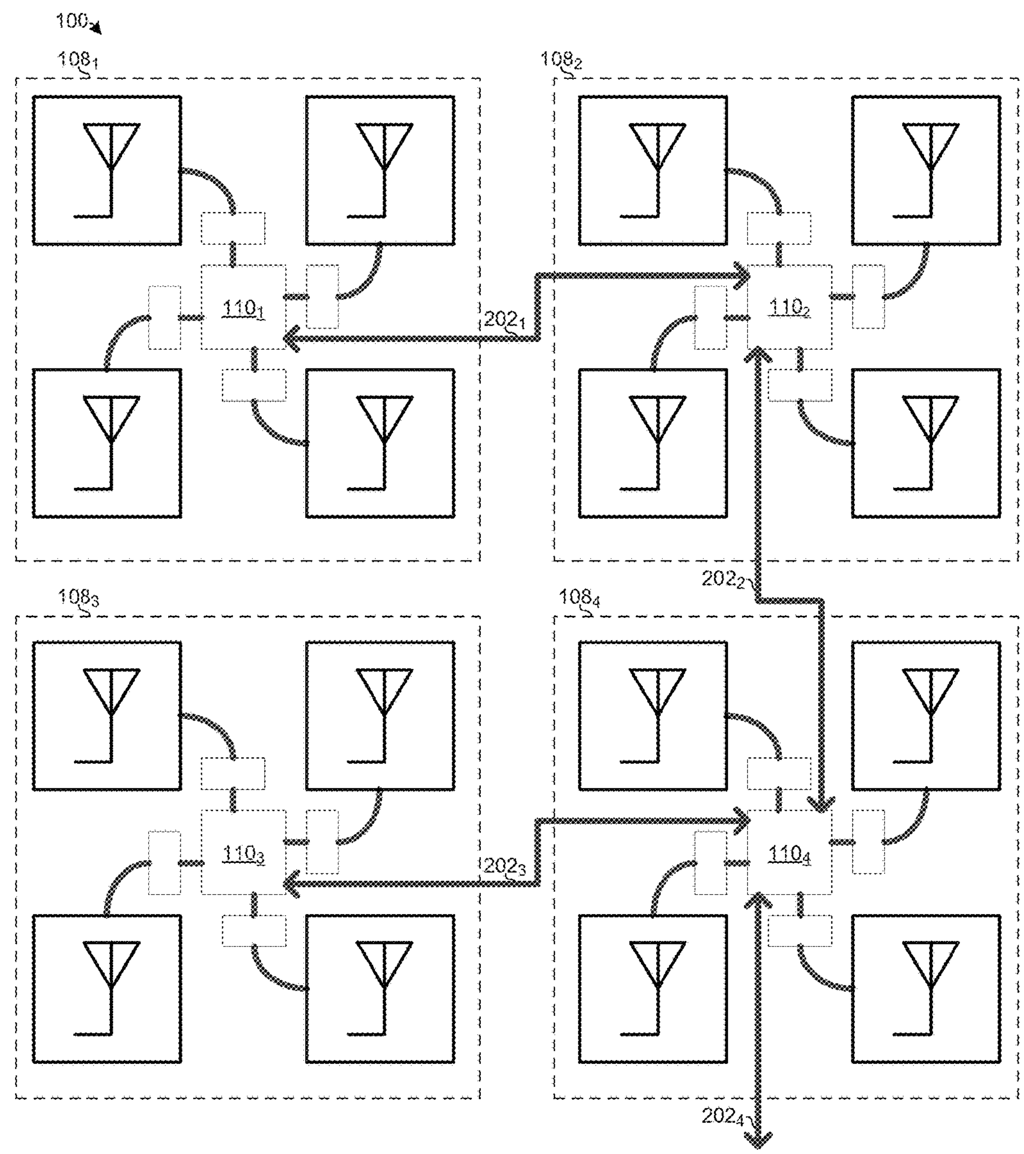
FIG. 2B shows details of an example implementation of the transceiver of FIG. 1A.
Figure 4:
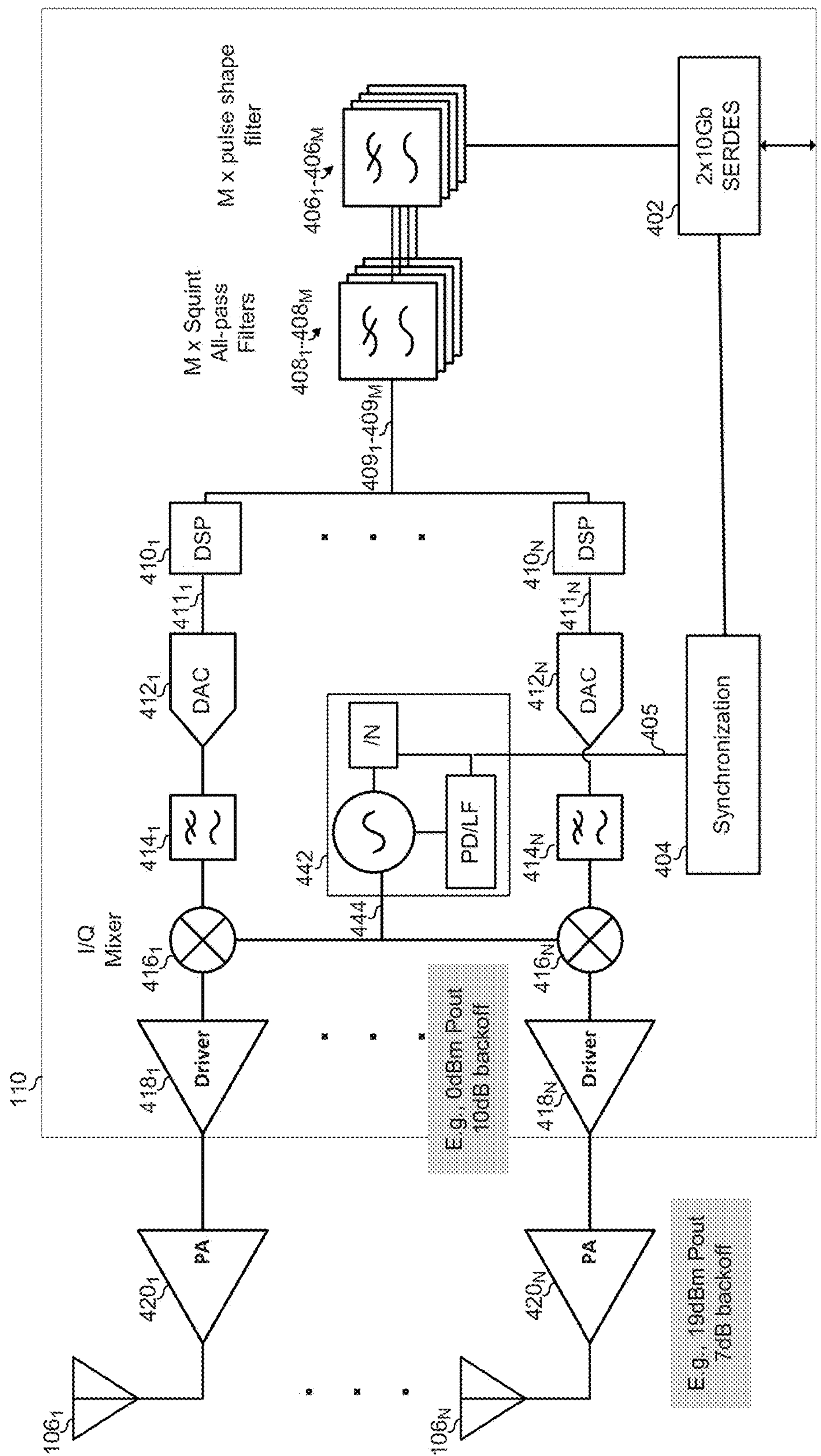
FIG. 4 depicts transmit circuitry of an example implementation of the unit cell of FIG. 1B.

As shown in FIG. 1B, an example unit cell 108 of a transceiver array 100 comprises a plurality of antenna elements 106 (e.g., four antenna elements per unit cell 108 in the examples of FIGS. 1B and 2B; and 'N' per unit cell in the example of FIG. 4), a transceiver circuit 110, and, for a time-division-duplexing (TDD) implementation, a plurality of transmit/receive switches 108. The respective power amplifiers (PAs) for each of the four antenna elements $\mathbf{106}_1$-$\mathbf{106}_4$ are not shown explicitly in FIG. 1B but may, for example, be integrated on the circuit 110 or may reside on a dedicated chip or subassembly (as shown, for example, in FIG. 4, below). The antenna elements 106, circuit 110, and circuit 108 may be mounted to a printed circuit board (PCB) 112 (or other substrate). The components shown in FIG. 1B are referred to herein as a "unit cell" because multiple instances of this unit cell 108 may be ganged together to form a larger transceiver array 100. In this manner, the architecture of a transceiver array 100 in accordance with various implementations of this disclosure may be modular and scalable. FIGS. 2A and 2B, for example, illustrate an implementation in which four unit cells 108, each having four antenna elements 106 and a transceiver circuit 110, have been ganged together to form a transceiver array 100 comprising sixteen antenna elements 106 and four transceiver circuits 110. The various unit cells 108 are coupled via lines 202 which, in an example implementation represent one or more data busses (e.g., high-speed serial busses similar to what is used in backplane applications) and/or one or more clock distribution traces (which may be referred to as a "clock tree"), as described below with reference to FIGS. 5A, 5B, 6A, and 6B.

Use of an array of antenna elements 106 enables beamforming for generating a radiation pattern having one or more high-gain beams. In general, any number of transmit and/or receive beams are supported.

In an example implementation, each of the antenna elements 106 of a unit cell 108 is a horn mounted to a printed circuit board (PCB) 112 with waveguide feed lines 114. The circuit 110 may be mounted to the same PCB 112. In this manner, the feed lines 114 to the antenna elements may be kept extremely short. For example, the entire unit cell 108 may be, for example, 6 cm by 6 cm such that length of the feed lines 114 may be on the order of centimeters. The horns may, for example, be made of molded plastic with a metallic coating such that they are very inexpensive. In another example implementation, the antenna elements 106 may be, for example, stripline or microstrip patch antennas.

The ability of the transceiver array 100 to use beamforming to simultaneously receive from multiple of the satellites 102 may enable soft handoffs of the transceiver array 110 between satellites 102. Soft handoff may reduce downtime as the transceiver array 100 switches from one satellite 102 to the next. This may be important because the satellites 102 may be orbiting at speeds such that any particular satellite 102 only covers the transceiver array 100 for on the order of 1 minute, thus resulting in very frequent handoffs. For example, satellite $\mathbf{102}_3$ may be currently providing primary coverage to the transceiver array 100 and satellite $\mathbf{102}_1$ may be the next satellite to come into view after satellite $\mathbf{102}_3$. The transceiver array 100 may be receiving data via beam $\mathbf{104}_3$ and transmitting data via beam 106 while, at the same time, receiving control information (e.g., a low data rate beacon comprising a satellite identifier) from satellite $\mathbf{102}_1$ via beam $\mathbf{104}_1$. The transceiver array 100 may use this control information for synchronizing circuitry, adjusting beamforming coefficients, etc., in preparation for being handed-off to satellite $\mathbf{102}_1$. The satellite to which the transceiver array 100 is transmitting may relay messages (e.g., ACKs or retransmit requests) to the other satellites from which transceiver array 100 is receiving.

FIG. 4 depicts transmit circuitry of an example implementation of the unit cell of FIG. 1B. In the example implementation shown, circuit 110 comprises a SERDES interface circuit 402, synchronization circuit 404, local oscillator generator 442, pulse shaping filters $\mathbf{406}_1$-$\mathbf{406}_M$ (M being an integer greater than or equal to 1), squint filters $\mathbf{408}_1$-$\mathbf{408}_M$, per-element digital signal processing circuits $\mathbf{410}_1$-$\mathbf{410}_N$, DACs $\mathbf{412}_1$-$\mathbf{412}_N$, filters $\mathbf{414}_1$-$\mathbf{414}_N$, mixers $\mathbf{416}_1$-$\mathbf{416}_N$, and drivers $\mathbf{418}_1$-$\mathbf{418}_N$. The outputs of the PA drivers $\mathbf{418}_1$-$\mathbf{418}_N$ are amplified by PAs $\mathbf{420}_1$-$\mathbf{420}_N$ before being transmitted via antenna elements $\mathbf{106}_1$-$\mathbf{106}_N$.

The SERDES interface circuit 402 is operable to exchange data with other instance(s) of the circuit 110 and other circuitry (e.g., a CPU) of the device 116.

The synchronization circuit 404 is operable to aid synchronization of a reference clock of the circuit 110 with the reference clocks of other instance(s) of the circuit 110 of the transceiver array 100. Example implementations of the synchronization circuit 404 are described below with reference to FIGS. 5A, 5B, 6A, and 6B.

The local oscillator generator 442 is operable to generate one or more local oscillator signals 444 based on the reference signal 405.

The pulse shaping filters $\mathbf{406}_1$-$\mathbf{406}_M$ (M being an integer greater than or equal to 1) are operable to receive bits to be transmitted from the SERDES interface circuit 402 and shape the bits before conveying them to the M squint processing filters $\mathbf{408}_1$-$\mathbf{408}_M$. In an example implementation, each pulse shaping filter $\mathbf{406}_m$ processes a respective one of M datastreams from the SERDES interface circuit 402.

Each of the squint filters $\mathbf{408}_1$-$\mathbf{408}_M$ is operable to compensate for squint effects which may result from bandwidth of the signals $\mathbf{409}_1$-$\mathbf{409}_M$ being wide relative to the center frequency.

Each of the per-element digital signal processing circuits $\mathbf{410}_1$-$\mathbf{410}_N$ is operable to perform processing on the signals $\mathbf{409}_1$-$\mathbf{409}_M$. Each one of the circuits $\mathbf{410}_1$-$\mathbf{410}_N$ may be configured independently of each of the other ones of the circuits $\mathbf{410}_1$-$\mathbf{410}_N$ such that each one of the signals $\mathbf{411}_1$-$\mathbf{411}_N$ may be processed as necessary/desired without impacting the other ones of the signals $\mathbf{411}_1$-$\mathbf{411}_N$.

Each of the DACs $\mathbf{412}_1$-$\mathbf{412}_N$ is operable to convert a respective one of the digital signals $\mathbf{411}_1$-$\mathbf{411}_N$ to an analog signal. Each of the filters $\mathbf{414}_1$-$\mathbf{414}_N$ is operable to filter (e.g., anti-alias filtering) the output of a respective one of the DACs $\mathbf{412}_1$-$\mathbf{412}_N$. Each of the mixers $\mathbf{416}_1$-$\mathbf{416}_N$ is operable to mix an output of a respective one of the filters $\mathbf{414}_1$-$\mathbf{414}_N$ with the local oscillator signal 444. Each of the PA drivers $\mathbf{418}_1$-$\mathbf{418}_N$ conditions an output of a respective one of the mixers $\mathbf{416}_1$-$\mathbf{416}_N$ for output to a respective one of PAs $\mathbf{420}_1$-$\mathbf{420}_N$. In a non-limiting example, each PA driver $\mathbf{418}_n$ (n being an integer between 1 and N) is operated at 10 dB from its saturation point and outputs a 0 dBm signal. In a non-limiting example, each PA $\mathbf{420}_n$ is operated at 7 dB from its saturation point and outputs a 19 dBm signal.

Figure 5A:
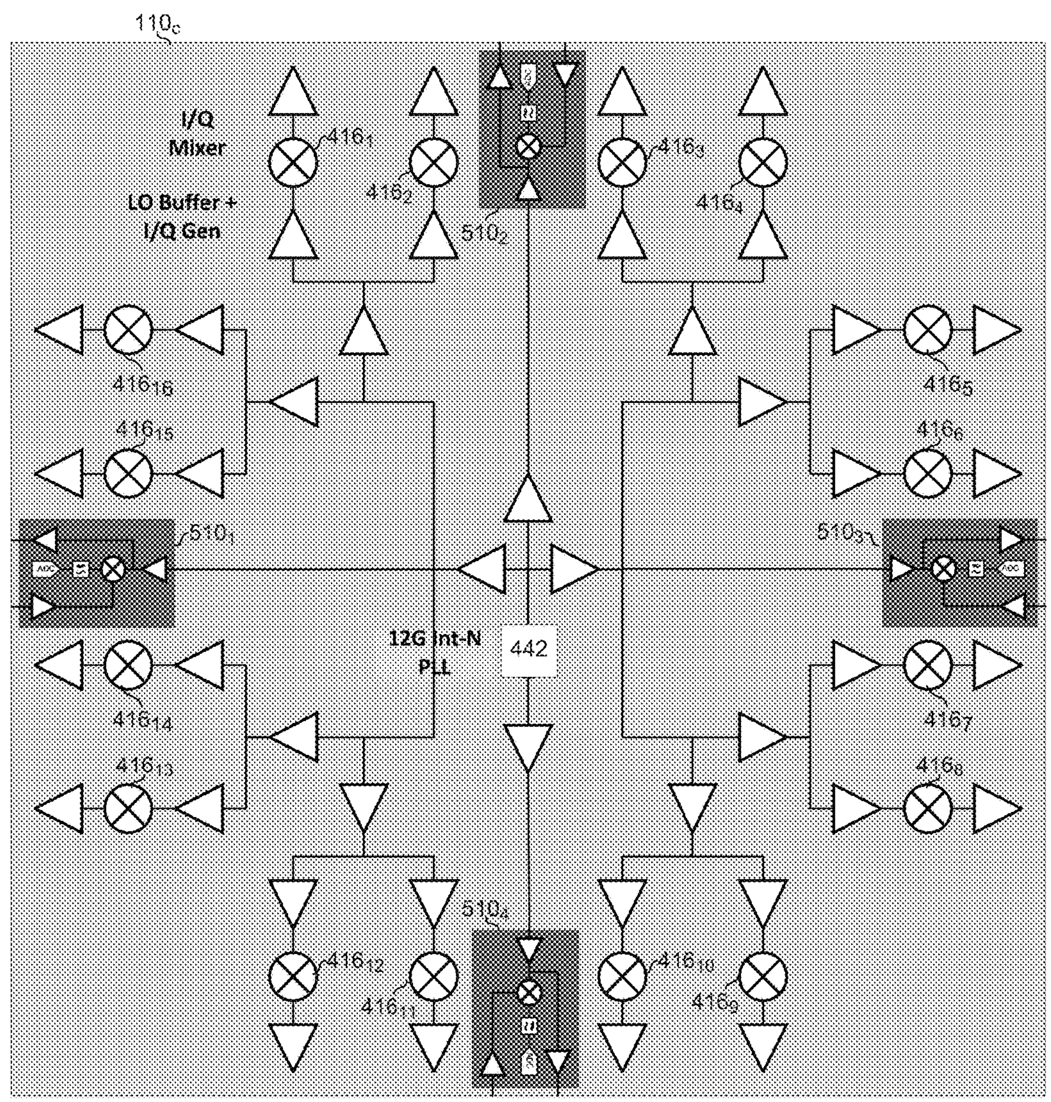
FIGS. 5A and 5B illustrate first a method and system for synchronizing the local oscillators across multiple chips of a transceiver array.

FIG. 5A illustrates clock synchronization among an array of transceivers in accordance with an example implementation of this disclosure. As shown, each circuit $\mathbf{110}_c$ (where c is between 1 and C for an array 100 consisting of C instances of circuit 110) comprise a local oscillator generator 442 (as shown in FIG. 4) and a clock distribution network comprising a plurality of traces and buffers. The reference signal generated by LO generator 442 (signal 444 of FIG. 4) is fed to circuits 510 (described below with reference to FIG. 5B) and to I/Q mixers $\mathbf{416}_1$-$\mathbf{416}_N$ (in the example shown N=16). Although phase mismatch introduced by the traces and buffers may be keep very small with current technologies, it may be desired to reduce it even further. To that end, a technique for reducing phase mismatch between circuits 110 of a transceiver array 100 is described below with reference to FIG. 5B.

Figure 5B:
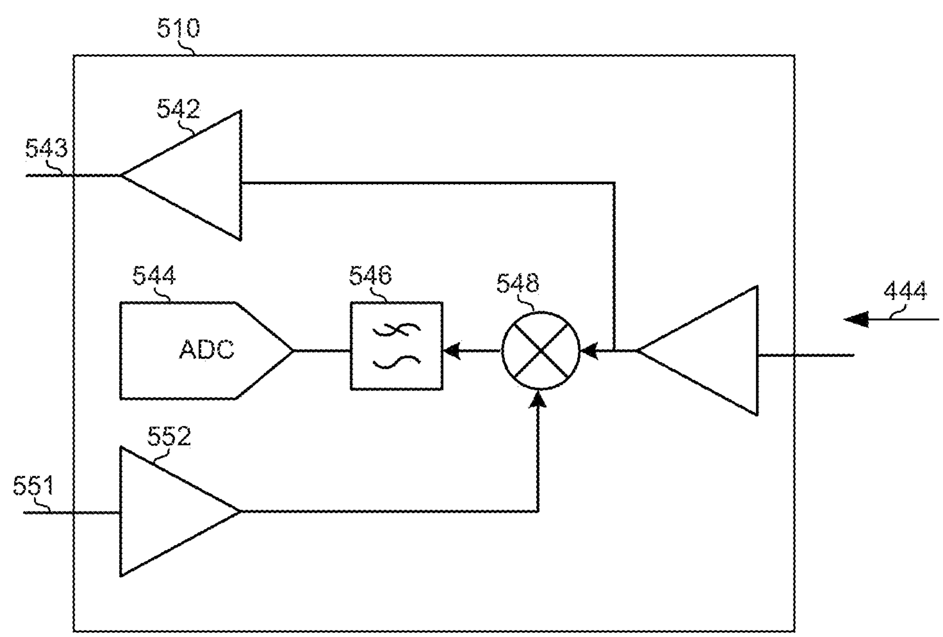

Now referring to FIG. 5B, an example implementation of circuit 510 of circuit $\mathbf{110}_c$ is configured to: make available, via pin 543 (or bond wire, solder ball, etc.), the reference signal 444 generated by local oscillator generator 442 to another circuit $\mathbf{110}_x$ (where x is an integer between 1 and C, and not equal to c) of the array 100; receive, via pin 551, a local oscillator signal 444 generated by another circuit $\mathbf{110}_{c \neq n}$ of the array 100; and determine a phase difference between the reference signal 444 of the first circuit $\mathbf{110}_c$ and the signal 444 of the second circuit $\mathbf{110}_x$. Elements 542 and 552 are clock drivers. In the example implementation shown, the phase difference is determined by mixing the two signals 444 together in mixer 548, filtering the resulting difference signal via low-pass filter 546, and digitizing the output of the filter 546 via ADC 544. In this manner, the digital value arrived at by ADC 544 represents a phase difference between the two reference signals.

An array coordinator may read (e.g., via a serial data bus that interconnects all of the circuits 110 of the array 100) the phase difference values from each of the circuits 550 in each of the circuits 110 of the array 100, determine an average of all the phase differences, and then adjust (e.g., via commands communicated over the serial bus) the phases of the reference oscillators 442 of the transceiver array 100 toward this average value such that, ideally, the value will be the same in all circuits 510 of the transceiver array 100. The array coordinator may be, for example, a processor of one of the circuits 110 of an array of circuits 110 designated as the coordinator based on some selection criteria, or a CPU of the device 116 (FIG. 1).

The calculation of the phase differences and correction of the phase of one or more oscillators of the array 100 may occur occasionally (e.g., at start up), periodically, and/or on an event driven basis (e.g., in response to an error rate exceeding a threshold). Accordingly, the circuits 510 may spend most of the time in a low power state.

Figure 6A:
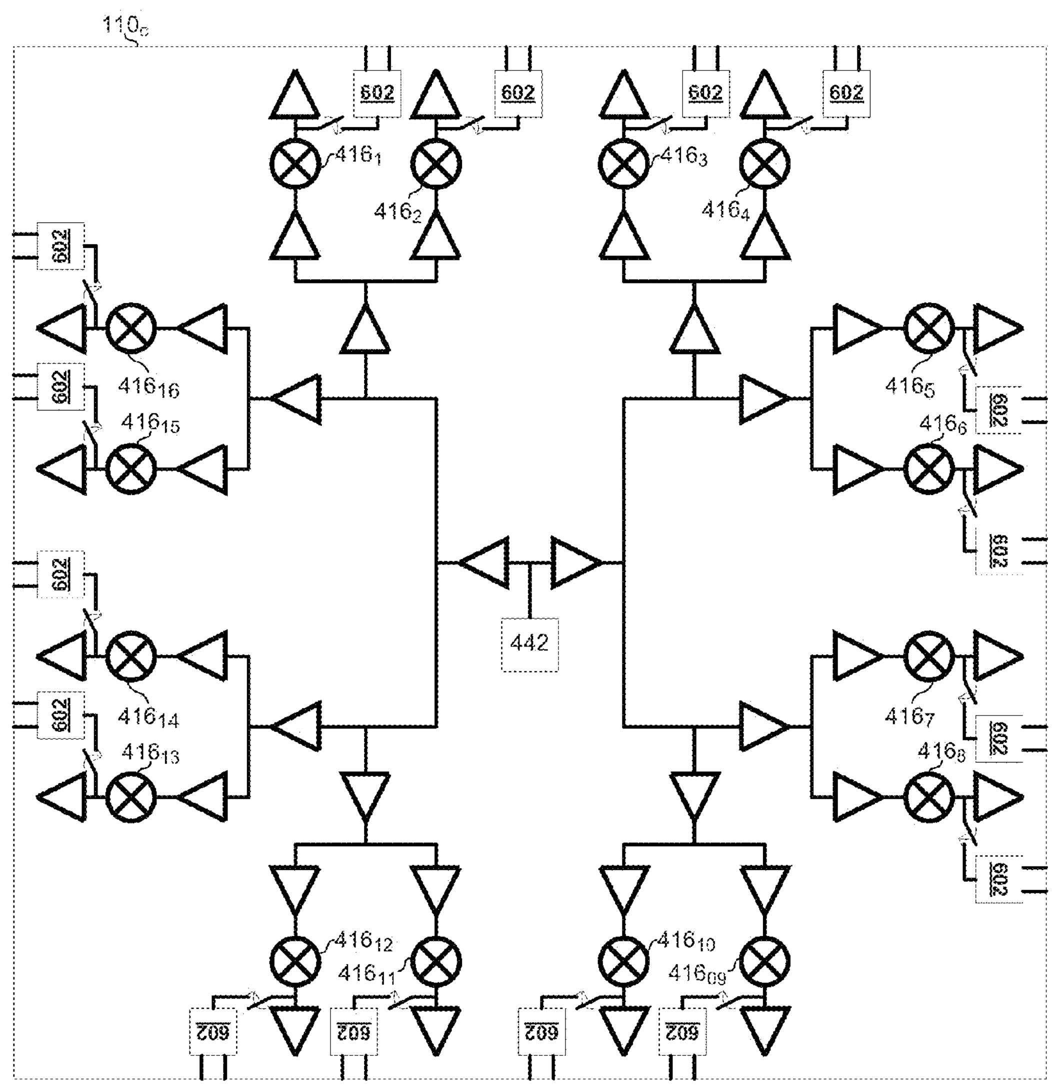
FIGS. 6A and 6B illustrate second method and system for synchronizing the local oscillators across multiple chips of a transceiver array.
Figure 6B:
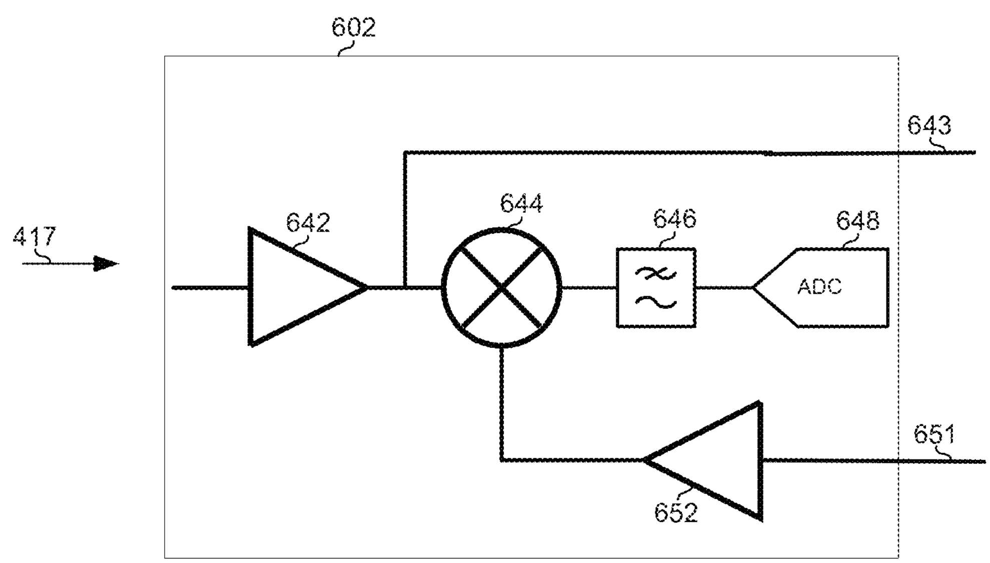

FIGS. 6A and 6B illustrate a second method and system for synchronizing the local oscillators across multiple chips of a transceiver array. In FIG. 6A, each circuit $\mathbf{110}_c$ comprises a local oscillator generator 442 (as shown in FIG. 4) and a clock distribution network comprising a plurality of traces and buffers. The reference signal generated by LO generator 442 (signal 444 of FIG. 4) is fed to I/Q mixers $\mathbf{416}_1$-$\mathbf{416}_N$ (in the example shown N=16) via the traces and buffers, and fed off-chip via the circuits 602 (described below with reference to FIG. 6B). The signal may be fed off-chip for purposes of synchronization with other instances of circuit 110 of the array 100, as described below with reference to FIG. 6B. In that regard, although phase mismatch introduced by the traces and buffers may be keep very small with current technologies, it may be desired to reduce it even further.

Now referring to FIG. 6B, an example implementation of circuit 602 of circuit $\mathbf{110}_c$ is configured to: make available, via pin 643 (or bond wire, solder ball, etc.), the mixer output signal $\mathbf{417}_n$ generated by mixer $\mathbf{416}_n$ to another circuit $\mathbf{110}_x$ (where x is an integer between 1 and C, and not equal to c) of the array 100; receive, via pin 651, mixer output $\mathbf{417}_n$ generated by another circuit $\mathbf{110}_{c \neq n}$ of the array 100; and determine a phase difference between the mixer output $\mathbf{417}_n$ of the first circuit $\mathbf{110}_c$ and mixer output $\mathbf{417}_n$ of the second circuit $\mathbf{110}_x$. Elements 642 and 652 are clock drivers. In the example implementation shown, the phase difference is determined by mixing the two signals $\mathbf{417}_n$ together in mixer 644, filtering the resulting difference signal via filter 646, and digitizing the output of the filter 646 via ADC 648. In this manner, the digital value arrived at by ADC 684 represents a phase difference between the two mixer outputs (e.g., generated by applying the same calibration signal (e.g., a single tone) to the two mixers $\mathbf{416}_n$ of the two circuits $\mathbf{110}_c$ and $\mathbf{110}_x$.

An array coordinator may read (e.g., via a serial data bus that interconnects all of the circuits 110 of the array 100) the phase difference values from each of the circuits 602 in each of the circuits 110 of the array 100, determine an average of all the phase differences, and then individually adjust (e.g., via commands communicated over the serial bus) each mixer 416 of the transceiver array 100 toward this average value such that, ideally, the value will be the same in all circuits 602 of the transceiver array 100. The array coordinator may be, for example, a processor of one of the circuits 110 of an array of circuits 110 designated as the coordinator based on some selection criteria, or a CPU of the device 116 (FIG. 1).

The calculation of the phase differences and correction of the phase of one or more oscillators of the array 100 may occur occasionally (e.g., at start up), periodically, and/or on an event driven basis (e.g., in response to an error rate exceeding a threshold). Accordingly, the circuits 602 may spend most of the time in a low power state (and disconnected from the output of its respective mixers 416).

As utilized herein the terms “circuits” and “circuitry” refer to physical electronic components (i.e. hardware) and any software and/or firmware (“code”) which may configure the hardware, be executed by the hardware, and or otherwise be associated with the hardware. As used herein, for example, a particular processor and memory may comprise a first “circuit” when executing a first one or more lines of code and may comprise a second “circuit” when executing a second one or more lines of code. As utilized herein, “and/or” means any one or more of the items in the list joined by “and/or”. As an example, “x and/or y” means any element of the three-element set {(x), (y), (x, y)}. In other words, “x and/or y” means “one or both of x and y”. As another example, “x, y, and/or z” means any element of the seven-element set {(x), (y), (z), (x, y), (x, z), (y, z), (x, y, z)}. In other words, “x, y and/or z” means “one or more of x, y and z”. As utilized herein, the term “exemplary” means serving as a non-limiting example, instance, or illustration. As utilized herein, the terms “e.g.,” and “for example” set off lists of one or more non-limiting examples, instances, or illustrations. As utilized herein, circuitry is “operable” to perform a function whenever the circuitry comprises the necessary hardware and code (if any is necessary) to perform the function, regardless of whether performance of the function is disabled or not enabled (e.g., by a user-configurable setting, factory trim, etc.).

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An array based communications system comprising:

a first local oscillator generator operable to generate a first local oscillator signal;

a first plurality of mixers operable to generate a first plurality of mixer outputs according to the first local oscillator signal;

a second local oscillator generator operable to generate a second local oscillator signal;

a second plurality of mixers operable to generate a second plurality of mixer outputs according to the second local oscillator signal; and an array coordinator operable to adjust a phase of the first local oscillator signal based on a phase difference between the first local oscillator signal and the second local oscillator signal, wherein the phase difference between the first local oscillator signal and the second local oscillator signal is an average phase difference between the first plurality of mixer outputs and the second plurality of mixer outputs.

2. The array based communications system of claim 1, wherein each mixer of the first plurality of mixers is operable to generate a mixer output by modulating the first local oscillator signal according to a weighted sum of a plurality of digital datastreams.

3. The array based communications system of claim 1, wherein each mixer of the second plurality of mixers is operable to generate a mixer output by modulating the second local oscillator signal according to a weighted sum of a plurality of digital datastreams.

4. The array based communications system of claim 1, comprising:

a phase differencing circuit operable to generate the phase difference between the first local oscillator signal and the second local oscillator signal, the differencing circuit comprising a mixer, a filter, and an analog-to-digital converter.

5. The array based communications system of claim 4, wherein the phase differencing circuit operates at start up.

6. The array based communications system of claim 4, wherein the phase differencing circuit operates periodically.

7. The array based communications system of claim 4, wherein the phase differencing circuit operates on an event driven basis.

8. The array based communications system of claim 4, wherein the phase differencing circuit operates in response to an error rate exceeding a threshold.

9. The array based communications system of claim 4, wherein the phase differencing circuit is in a low power state while not operating.

10. A method for array based communications comprising:

generating a first local oscillator signal by using a first local oscillator generator;

generating a first plurality of mixer outputs by using a first plurality of mixers and the first local oscillator signal;

generating a second local oscillator signal by using a second local oscillator generator;

generating a second plurality of mixer outputs by using a second plurality of mixers and the second local oscillator signal; and adjusting a phase of the first local oscillator signal by using an array coordinator and a phase difference between the first local oscillator signal and the second local oscillator signal, wherein the phase difference between the first local oscillator signal and the second local oscillator signal is an average phase difference between the first plurality of mixer outputs and the second plurality of mixer outputs.

11. The method for array based communications of claim 10, wherein generating each mixer output of the first plurality of mixer outputs comprises modulating the first local oscillator signal according to a weighted sum of a plurality of digital datastreams.

12. The method for array based communications of claim 10, wherein generating each mixer output of the second plurality of mixer outputs comprises modulating the second local oscillator signal according to a weighted sum of a plurality of digital datastreams.

13. The method for array based communications of claim 10, wherein the method comprises generating the phase difference between the first local oscillator signal and the second local oscillator signal using a mixer, a filter, and an analog-to-digital converter.

14. The method for array based communications of claim 13, wherein the phase difference is generated at start up.

15. The method for array based communications of claim 13, wherein the phase difference is generated periodically.

16. The method for array based communications of claim 13, wherein the phase difference is generated on an event driven basis.

17. The method for array based communications of claim 13, wherein the phase difference is generated in response to an error rate exceeding a threshold.

18. The method for array based communications of claim 13, wherein the mixer, the filter, and the analog-to-digital converter are in a low power state when the phase difference is not being generated.

19. An array based communications system comprising:

a first local oscillator generator operable to generate a first local oscillator signal;

a first plurality of mixers operable to generate a first plurality of mixer outputs according to the first local oscillator signal;

a second local oscillator generator operable to generate a second local oscillator signal;

a second plurality of mixers operable to generate a second plurality of mixer outputs according to the second local oscillator signal;

an array coordinator operable to adjust a phase of the first local oscillator signal based on a phase difference between the first local oscillator signal and the second local oscillator signal; and a phase differencing circuit operable to generate the phase difference between the first local oscillator signal and the second local oscillator signal, the differencing circuit comprising a mixer, a filter, and an analog-to-digital converter, wherein the phase differencing circuit operates in response to an error rate exceeding a threshold.

20. The array based communications system of claim 19, wherein each mixer of the first plurality of mixers is operable to generate a mixer output by modulating the first local oscillator signal according to a weighted sum of a plurality of digital datastreams.

21. The array based communications system of claim 19, wherein each mixer of the second plurality of mixers is operable to generate a mixer output by modulating the second local oscillator signal according to a weighted sum of a plurality of digital datastreams.

22. The array based communications system of claim 19, wherein the phase differencing circuit operates at start up.

23. The array based communications system of claim 19, wherein the phase differencing circuit operates periodically.

24. The array based communications system of claim 19, wherein the phase differencing circuit operates on an event driven basis.

25. The array based communications system of claim 19, wherein the phase differencing circuit is in a low power state while not operating.

26. A method for array based communications comprising:

generating a first local oscillator signal by using a first local oscillator generator;

generating a first plurality of mixer outputs by using a first plurality of mixers and the first local oscillator signal;

generating a second local oscillator signal by using a second local oscillator generator;

generating a second plurality of mixer outputs by using a second plurality of mixers and the second local oscillator signal; and adjusting a phase of the first local oscillator signal by using an array coordinator and a phase difference between the first local oscillator signal and the second local oscillator signal; and generating the phase difference between the first local oscillator signal and the second local oscillator signal using a mixer, a filter, and an analog-to-digital converter, wherein the phase difference is generated in response to an error rate exceeding a threshold.

27. The method for array based communications of claim 26, wherein generating each mixer output of the first plurality of mixer outputs comprises modulating the first local oscillator signal according to a weighted sum of a plurality of digital datastreams.

28. The method for array based communications of claim 26, wherein generating each mixer output of the second plurality of mixer outputs comprises modulating the second local oscillator signal according to a weighted sum of a plurality of digital datastreams.

29. The method for array based communications of claim 26, wherein the phase difference is generated at start up.

30. The method for array based communications of claim 26, wherein the phase difference is generated periodically.

31. The method for array based communications of claim 26, wherein the phase difference is generated on an event driven basis.

32. The method for array based communications of claim 26, wherein the mixer, the filter, and the analog-to-digital converter are in a low power state when the phase difference is not being generated.

33. An array based communications system comprising:

a first local oscillator generator operable to generate a first local oscillator signal;

a first plurality of mixers operable to generate a first plurality of mixer outputs according to the first local oscillator signal;

a second local oscillator generator operable to generate a second local oscillator signal;

a second plurality of mixers operable to generate a second plurality of mixer outputs according to the second local oscillator signal;

an array coordinator operable to adjust a phase of the first local oscillator signal based on a phase difference between the first local oscillator signal and the second local oscillator signal; and a phase differencing circuit operable to generate the phase difference between the first local oscillator signal and the second local oscillator signal, the differencing circuit comprising a mixer, a filter, and an analog-to-digital converter, wherein the phase differencing circuit is in a low power state while not operating.

34. The array based communications system of claim 33, wherein each mixer of the first plurality of mixers is operable to generate a mixer output by modulating the first local oscillator signal according to a weighted sum of a plurality of digital datastreams.

35. The array based communications system of claim 33, wherein each mixer of the second plurality of mixers is operable to generate a mixer output by modulating the second local oscillator signal according to a weighted sum of a plurality of digital datastreams.

36. The array based communications system of claim 33, wherein the phase differencing circuit operates at start up.

37. The array based communications system of claim 33, wherein the phase differencing circuit operates periodically.

38. The array based communications system of claim 33, wherein the phase differencing circuit operates on an event driven basis.

39. A method for array based communications comprising:

generating a first local oscillator signal by using a first local oscillator generator;

generating a first plurality of mixer outputs by using a first plurality of mixers and the first local oscillator signal;

generating a second local oscillator signal by using a second local oscillator generator;

generating a second plurality of mixer outputs by using a second plurality of mixers and the second local oscillator signal; and adjusting a phase of the first local oscillator signal by using an array coordinator and a phase difference between the first local oscillator signal and the second local oscillator signal; and generating the phase difference between the first local oscillator signal and the second local oscillator signal using a mixer, a filter, and an analog-to-digital converter, wherein the mixer, the filter, and the analog-to-digital converter are in a low power state when the phase difference is not being generated.

40. The method for array based communications of claim 39, wherein generating each mixer output of the first plurality of mixer outputs comprises modulating the first local oscillator signal according to a weighted sum of a plurality of digital datastreams.

41. The method for array based communications of claim 39, wherein generating each mixer output of the second plurality of mixer outputs comprises modulating the second local oscillator signal according to a weighted sum of a plurality of digital datastreams.

42. The method for array based communications of claim 39, wherein the phase difference is generated at start up.

43. The method for array based communications of claim 39, wherein the phase difference is generated periodically.

44. The method for array based communications of claim 39, wherein the phase difference is generated on an event driven basis.

* * * * *